(12) United States Patent
Kulkarni et al.

(10) Patent No.: US 7,281,093 B1
(45) Date of Patent: Oct. 9, 2007

(54) MEMORY APPARATUS FOR A MESSAGE PROCESSING SYSTEM AND METHOD OF PROVIDING SAME

(75) Inventors: Chidamber R. Kulkarni, San Jose, CA (US); Gordon J. Brebner, Campbell, CA (US)

(73) Assignee: Xilinx, Inc., San Jose, CA (US)

( * ) Notice: Subject to any disclaimer, the term of this patent is extended or adjusted under 35 U.S.C. 154(b) by 358 days.

(21) Appl. No.: 11/019,484

(22) Filed: Dec. 21, 2004

(51) Int. Cl.
 *G06F 13/00* (2006.01)
(52) U.S. Cl. .......................................... 711/148; 326/39
(58) Field of Classification Search ...................... None
 See application file for complete search history.

(56) References Cited

U.S. PATENT DOCUMENTS

| | | | |
|---|---|---|---|
| 4,096,571 A * | 6/1978 | Vander Mey | 711/151 |
| 5,790,545 A * | 8/1998 | Holt et al. | 370/398 |
| 6,006,296 A | 12/1999 | Gold et al. | |
| 6,346,825 B1 * | 2/2002 | Pang et al. | 326/40 |
| 6,513,108 B1 * | 1/2003 | Kerr et al. | 712/19 |
| 6,522,167 B1 * | 2/2003 | Ansari et al. | 326/39 |
| 6,567,426 B1 * | 5/2003 | van Hook et al. | 370/535 |
| 6,622,228 B2 | 9/2003 | Jeddeloh | |
| 7,185,309 B1 | 2/2007 | Kulkarni et al. | |
| 2003/0163589 A1 * | 8/2003 | Bunce et al. | 709/250 |

OTHER PUBLICATIONS

Arpaci-Dusseau. CPU Scheduling. University of Wisconsin-Madison. [retrieved on Jan. 18, 2007] Retrieved from the Internet <http://www.cs.wisc.edu/~eli/537/lectures/handout9.2x2.pdf>.*

U.S. Appl. No. 10/769,592, Brebner, Gordon J., et al., "Method for Message Processing on a Programmable Logic Device" filed Jan. 30, 2004, 67 pages.

U.S. Appl. No. 10/769,330, Philip B. James-Roxby et al., "Method and Apparatus for Multithreading on a Programmable Logic Device", filed Jan. 30, 2004, 66 pages.

U.S. Appl. No. 10/769,331, Erick R. Keller et al., "Method and Apparatus for a Programming Interface of a Soft Platform on a Programmable Logic Device", filed Jan. 20, 2004, 66 pages.

U.S. Appl. No. 11/067,431, Eric R. Keller et al., "Thread Circuits and a Broadcast Channel on a Programmable Logic Device", filed Feb. 25, 2005, 65 pages.

U.S. Appl. No. 11/699,097, Chidamber Kularni et al., "Method and Apparatus for Application-Specific Programmable Memory Architecture and Interconnection Network on a Chip", Jan. 29, 2007, 60 pages.

* cited by examiner

*Primary Examiner*—Reginald Bragdon
*Assistant Examiner*—Larry T Mackall
(74) *Attorney, Agent, or Firm*—Robert Brush; Michael R. Hardaway

(57) ABSTRACT

Memory apparatus for a message processing system and method of providing the same is described. In one example, a message processing system (200) includes a set of n processing elements (202) for processing messages, where n is an integer greater than zero. A set of m memories (204) is provided for storing the messages, where m is an integer greater than zero. Multiplexing logic (206) is provided for coupling each of the processing elements to each of the memories. Control logic (208) is provided for driving the multiplexing logic to provide access to each of the memories among the processing elements in accordance with a gated module-n schedule.

16 Claims, 6 Drawing Sheets

MEMORY APPARATUS FOR A MESSAGE PROCESSING SYSTEM AND METHOD OF PROVIDING SAME

FIELD OF THE INVENTION

One or more aspects of the present invention relate generally to memory systems and, more particularly, to a memory apparatus for a message processing system and a method of providing the same.

BACKGROUND OF THE INVENTION

Programmable logic devices (PLDs) exist as a well-known type of integrated circuit (IC) that may be programmed by a user to perform specified logic functions. There are different types of programmable logic devices, such as programmable logic arrays (PLAs) and complex programmable logic devices (CPLDs). One type of programmable logic device, known as a field programmable gate array (FPGA), is very popular because of a superior combination of capacity, flexibility, time-to-market, and cost.

An FPGA typically includes an array of configurable logic blocks (CLBs) surrounded by a ring of programmable input/output blocks (IOBs). The CLBs and IOBs are interconnected by a programmable interconnect structure. The CLBs, IOBs, and interconnect structure are typically programmed by loading a stream of configuration data (known as a bitstream) into internal configuration memory cells that define how the CLBs, IOBs, and interconnect structure are configured. An FPGA may also include various dedicated logic circuits, such as memories, microprocessors, digital clock managers (DCMs), and input/output (I/O) transceivers.

Typically, network devices, such as routers, employ dedicated, special purpose components for processing packets that propagate through the network. Conventionally, network devices employ network processors or application specific integrated circuits (ASICs) to provide the desirable packet processing/network processing functions. Notably, ASICs employed for network processing functions typically include a static memory architecture that provides a fixed amount of memory resources with a fixed interconnection scheme. Dedicated network processors typically communicate with off-chip memories using a bus structure having a fixed width. Accordingly, there exists a need in the art for more flexible memory architectures and organizations for use in message processing systems.

SUMMARY OF THE INVENTION

Memory apparatus for a message processing system and method of providing the same is described. In one embodiment, a message processing system includes a set of n processing elements for processing messages, where n is an integer greater than zero. A set of m memories is provided for storing the messages, where m is an integer greater than zero. Multiplexing logic is provided for coupling each of the processing elements to each of the memories. Control logic is provided for driving the multiplexing logic to provide access to each of the memories among the processing elements in accordance with a gated module-n schedule. In one embodiment, the each of the memories comprises a memory circuit embedded within a programmable logic device, such as an FPGA (e.g., block RAMs). The multiplexing logic and the control logic may be configured using programmable logic blocks and programmable interconnect of the FPGA.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Memory apparatus for a message processing system and method of providing the same is described. One or more aspects of the invention are also related to message processing (MP) systems. As used herein, the term "message" encompasses packets, cells, frames, data units, and like type blocks of information known in the art that is passed over a communication channel. A "message processing" system is a system or subsystem for processing messages (e.g., a packet processing system or a network processing system).

In addition, one or more aspects of the invention are described with respect to providing a memory system using an FPGA. Those skilled in the art will appreciate, however, that the present invention may be used to provide memory systems for other types of programmable logic devices, such as complex programmable logic devices (CPLDs).

Figure 1:
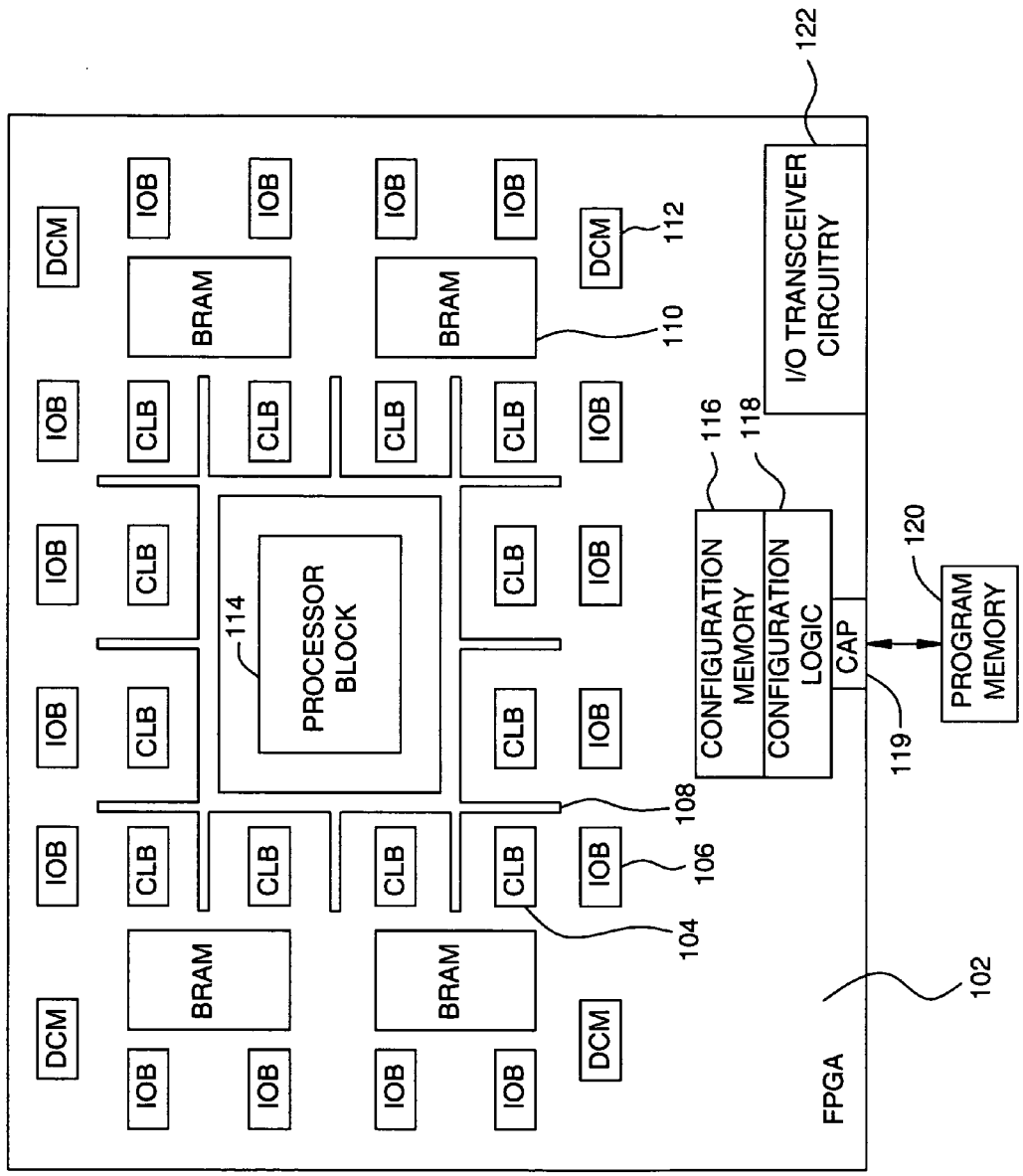
FIG. 1 is a block diagram depicting an exemplary embodiment of an FPGA coupled to a program memory.

In particular, FIG. 1 is a block diagram depicting an exemplary embodiment of an FPGA 102 coupled to a program memory 120. The FPGA 102 illustratively comprises programmable logic circuits or "blocks", illustratively shown as CLBs 104, IOBs 106, and programmable interconnect 108 (also referred to as "programmable logic"), as well as configuration memory 116 for determining the functionality of the FPGA 102. The FPGA 102 may also include an embedded processor block 114, as well as various dedicated internal logic circuits, illustratively shown as blocks of random access memory ("BRAM 110"), configuration logic 118, digital clock management (DCM) blocks 112, and input/output (I/O) transceiver circuitry 122. Those skilled in the art will appreciate that the FPGA 102 may include other types of logic blocks and circuits in addition to those described herein.

As is well known in the art, the IOBs 106, the CLBs 104, and the programmable interconnect 108 may be configured to perform a variety of functions. Notably, the CLBs 104 are programmably connectable to each other, and to the IOBs 106, via the programmable interconnect 108. Each of the CLBs 104 may include one or more "slices" and programmable interconnect circuitry (not shown). Each CLB slice in turn includes various circuits, such as flip-flops, function generators (e.g., a look-up tables (LUTs)), logic gates, memory, and like type well-known circuits. The IOBs 106 are configured to provide input to, and receive output from, the CLBs 104.

Configuration information for the CLBs 104, the IOBs 106, and the programmable interconnect 108 is stored in the configuration memory 116. The configuration memory 116 may include static random access memory (SRAM) cells. The configuration logic 118 provides an interface to, and controls configuration of, the configuration memory 116. A configuration bitstream produced from the program memory 120 may be coupled to the configuration logic 118 through a configuration port 119. The configuration process of FPGA 102 is also well known in the art.

The I/O transceiver circuitry 122 may be configured for communication over any of a variety of media, such as wired, wireless, and photonic, whether analog or digital. The I/O transceiver circuitry 122 may comprise gigabit or multi-gigabit transceivers (MGTs). The DCM blocks 112 provide well-known clock management circuits for managing clock signals within the FPGA 102, such as delay lock loop (DLL) circuits and multiply/divide/de-skew clock circuits.

The processor block 114 comprises a microprocessor core, as well as associated control logic. Notably, such a microprocessor core may include embedded hardware or embedded firmware or a combination thereof for a "hard" or "soft" microprocessor. A soft microprocessor may be implemented using the programmable logic of the FPGA 102 (e.g., CLBs 104, IOBs 106). For example, a MICROBLAZE soft microprocessor, available from Xilinx of San Jose, Calif., may be employed. A hard microprocessor may be implemented using an IBM POWER PC, Intel PENTIUM, AMD ATHLON, or like type processor core known in the art.

The processor block 114 is coupled to the programmable logic of the FPGA 102 in a well known manner. For purposes of clarity by example, the FPGA 102 is illustrated with 12 CLBs, 16 IOBs, 4 BRAMs, 4 DCMs, and one processor block. Those skilled in the art will appreciate that actual FPGAs may include one or more of such components in any number of different ratios. For example, the FPGA 102 may be selected from the VIRTEX-II PRO family of products, commercially available from Xilinx, Inc. of San Jose, Calif.

Figure 2:
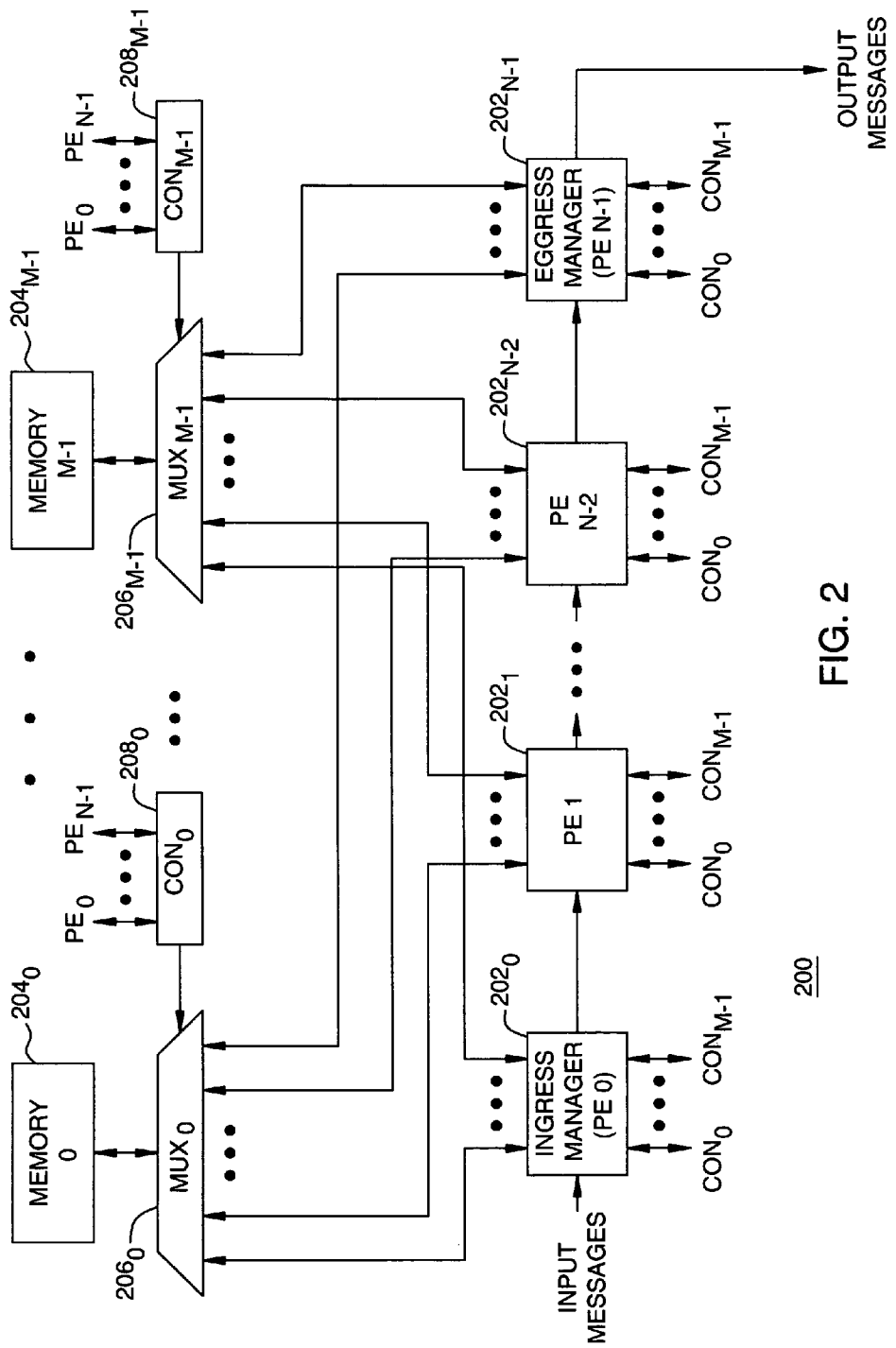
FIG. 2 is a block diagram depicting an exemplary embodiment of a message processing system constructed in accordance with the invention.

FIG. 2 is a block diagram depicting an exemplary embodiment of a message processing system 200 in accordance with the invention. In embodiment, at least a portion of the system 200 may be implemented using an FPGA. The system 200 comprises processing elements (PEs) $202_0$ through $202_{N-1}$ (collectively referred to as processing elements 202), memories $204_0$ through $204_{M-1}$ (collectively referred to as memories 204), multiplexers (MUXs) $206_0$ through $206_{M-1}$, and control circuits (CONs) $208_0$ through $208_{M-1}$, where N and M are integers greater than zero. The multiplexers $206_0$ through $206_{M-1}$ collectively comprise multiplexer logic 206. The control circuits $208_0$ through $208_{M-1}$ collectively comprise control logic 208. The processing element $202_0$ comprises an ingress manager for receiving messages to be stored and processed by the system 200, and the processing element $202_{N-1}$ comprises an egress manager for providing messages that have been stored and processed by the system 200.

In the present embodiment, the processing elements 202 are arranged in a pure pipeline configuration. That is, an output terminal of the PE $202_0$ is coupled to an input terminal of the PE $202_1$, an output terminal of the PE $202_1$ is coupled to an input terminal of the next PE, and so on until the output terminal of the PE $202_{N-1}$ is coupled to an input terminal of the PE $202_{N-1}$. An input terminal of the ingress manager $202_0$ is configured to receive input messages, and an output terminal of the egress manager $202_{N-1}$ is configured to provide output messages.

A memory interface of each of the processing elements 202 is coupled to an input port of each of the multiplexers $206_0$ through $206_{M-1}$. Output ports of the multiplexers $206_0$ through $206_{M-1}$ are respectively coupled to interfaces of the memories $204_0$ through $204_{M-1}$. The memory interface of each of the processing elements 202, as well as the input and output ports of the multiplexers $206_0$ through $206_{M-1}$, may have a width, k, where k is determined by the interface to the memories 204. For example, for if the memories 204 comprise BRAM, the memory interface comprises signals related to enable, address, write, and data to collectively provide a 20-bit wide interface.

Select terminals of the multiplexers $206_0$ through $206_{M-1}$ are respectively coupled to output terminals of the control circuits $208_0$ through $208_{M-1}$. Each of the processing elements 202 is coupled to a control port of each of the control circuits $208_0$ through $208_{M-1}$. That is, each of the processing elements 202 includes M control interfaces respectively coupled to the M control circuits 208. Stated differently, each of the control circuits $208_0$ through $208_{M-1}$ includes N control interfaces respectively coupled to the N processing elements 202.

In one embodiment, the system 200 is implemented using a programmable logic device, such as an FPGA. Notably, the memories 204 may comprise random access memory (RAM) embedded within an FPGA, such as static random access memory (SRAM) or BRAM. The multiplexers $206_0$ through $206_{M-1}$, the control circuits $208_0$ through $208_{M-1}$, and the processing elements 202 may be configured within an FPGA using programmable logic blocks and interconnect, may comprise dedicated circuitry embedded within the FPGA, or may comprise a portion of both programmable logic and dedicated circuitry. Use of an FPGA to provide a memory architecture for a message processing system allows for a scalable, domain-specific memory organization that has a concise interface, that is reusable, that has minimal addressing overhead, that can be deployed in a variety of computation structures, and that enables a reduction in power consumption.

Notably, in an FPGA, the number of memories 204 that may be used in the system 200 depends upon the number of processing elements 202 and the available routing resources (e.g., wires) in the FPGA. Ideally, the number of memories 204 equals the number of processing elements in the system 200 (i.e., M=N), with dedicated routing between each of the processing elements 202 and each of the multiplexers $206_0$ through $206_{M-1}$, as well as between each of the processing elements 202 and each of the control circuits $208_0$ through $208_{M-1}$. However, in practice, the number of processing elements 202 can be large and themselves consume enough routing resources to deter implementation of a large number of memories 204. In such a scenario, less memories 204 may be used than there are processing elements 202 (i.e., M<N), various routing resources may be shared rather than dedicated (e.g., a bus), or both.

In operation, the memory architecture of the system 200 is configured to match the nature of message processing applications, wherein messages arrive at the ingress manager $202_0$ from an external interface and are stored in the memories 204, a series of processing functions are performed on the messages, and the processed messages are transferred to another (or the same) external interface. Each of the remaining processing elements $202_1$ through $202_{N-2}$ is configured to perform a particular function or operation on the stored messages. For example, the system 200 may be configured to process internet protocol (IP) packets and may include processing elements for checking the IP header, performing an IP lookup, decrementing a time-to-live (TTL) field in IP packets, and like-type IP processing operations.

The processing elements 202 access the memories 204 to read messages from the memories 204, as well as write processed messages to the memories 204. In particular, the processing elements 202 access the memories 204 using the multiplexer logic 206, which is controlled via the control logic 208. For each of the memories 204, the control logic 208 implements a gated module-N schedule for memory accesses among the N processing elements 202. That is, for a particular one of the memories 204, memory access cycles from the ingress manager $202_0$ through the processing elements $202_1$ to $202_{N-2}$ to the egress manager $202_{N-1}$ and back to the ingress manager $202_0$. Only one of the processing elements may access a given one of the memories 204 at a time. The memory access is gated in that a processing element in the pipeline cannot obtain memory access until the proceeding processing element signals that its memory access is complete or that it does not require a memory access. The gating of memory access accounts for non-uniform processing latencies of the processing elements 202 (e.g., the processing element $202_1$ may take longer to process a message than the processing element $202_2$).

Since the ingress manager $202_0$ is granted memory access in accordance with the gated modulo-N schedule described above, the input messages are allocated over the M memories 204 based on a modulo-M schedule. For example, the first message is allocated to the memory $204_0$, the next message is allocated to the memory $204_1$, and so forth until the Mth message is again allocated to the memory $204_0$. Likewise, since the egress manager $202_{N-1}$ is granted memory access in accordance with the gated modulo-N schedule, the messages are de-allocated from the M memories 204 in accordance with a modulo-M schedule. In one embodiment, the ingress manager $202_0$ and the egress manager $202_{N-1}$ are buffers with memory access functions (i.e., buffers that are capable of pushing/pulling messages to/from a given memory location).

Figure 3:
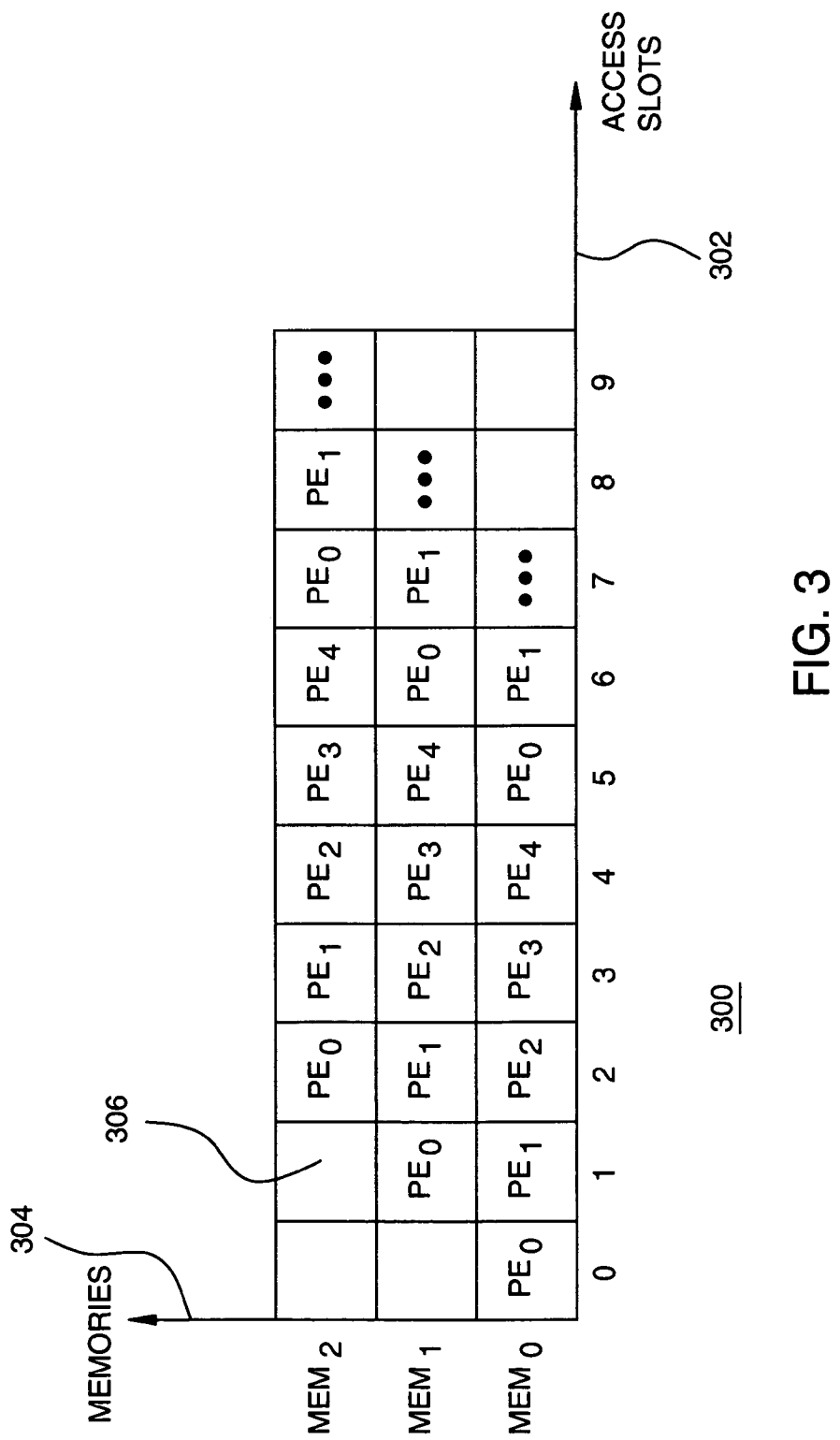
FIG. 3 is a chart illustrating an exemplary embodiment of memory access schedule in accordance with the invention.

FIG. 3 is a chart 300 illustrating an exemplary embodiment of memory access schedule in accordance with the invention. In the present example, the system 200 includes three memories (MEMs) 204 (i.e., M=3) and five processing elements 202 including the ingress manager $202_0$ and the egress manager $202_{N-1}$ (i.e., N=5). The chart 300 includes a horizontal axis 302 representing access slots, a vertical axis 304 representing the memories 204, and cells 306. Each of the cells 306 corresponds to a particular memory and access slot and includes the particular one of the processing elements 202 that is granted memory access.

As shown, during access slot 0, $PE_0$ is granted access to $MEM_0$. During access slot 1, $PE_0$ is granted access to $MEM_1$ and $PE_1$ is granted access to $MEM_0$. During access slot 2, $PE_0$ is granted access to $MEM_2$, $PE_1$ is grated access to $MEM_1$, and $PE_2$ is granted access to $MEM_0$. During access slot 3, $PE_0$ no longer has access to any of the three memories. In access slot 3, $PE_1$ is granted access to $MEM_2$, $PE_2$ is grated access to $MEM_1$, and $PE_3$ is granted access to $MEM_0$. $PE_0$ does not obtain memory access again until access slot 5, at which slot $PE_0$ is again granted memory access to $MEM_0$. This schedule is repeated for additional access slots. Note that the access slots may provide memory access to a given PE for an arbitrary number of clock cycles. That is, access slots may have non-uniform durations in terms of clock cycles.

Returning to FIG. 2, as the control logic 208 implements the gated modulo-N access schedule, each of the processing elements 202 may choose memory access or skip memory access by communicating such to the control logic 208. In addition, the control logic 208 may provide status information to, or receive status information from, each of the processing elements 202. The connection between every one of the processing elements 202 and every one of the control circuits $208_0$ through $208_{M-1}$ allows for the communication of control information (e.g., a choose/skip signal), status information, and the like. Each connection between a processing element and a control circuit may be configured to communicate a plurality of signals.

Figure 4:
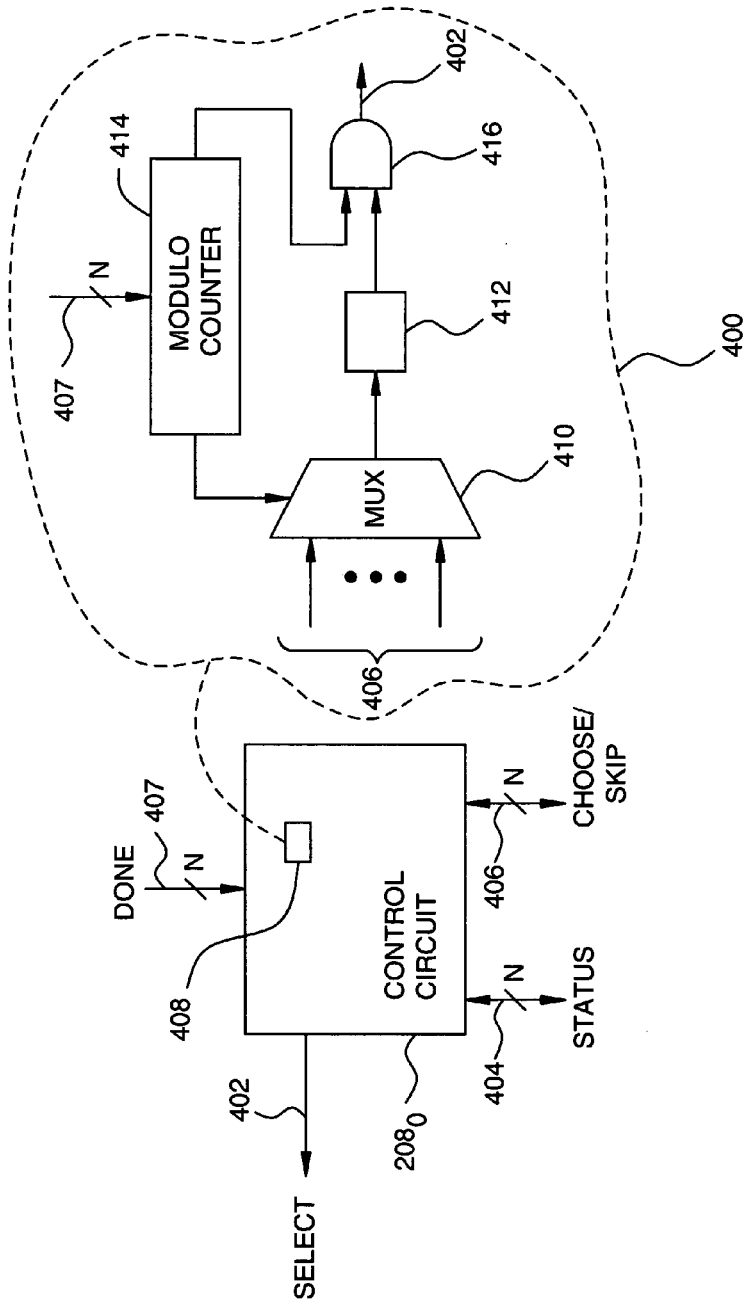
FIG. 4 is a block diagram depicting an exemplary embodiment of a control circuit constructed in accordance with the invention.

In particular, FIG. 4 is a block diagram depicting an exemplary embodiment of the control circuit $208_0$ in accordance with the invention. It is to be understood that the other control circuits $208_1$ through $208_{M-1}$ are identical to the embodiment shown in FIG. 4. The control circuit $208_0$ comprises a select port 402, a status port 404, a choose/skip port 406, a done port 407, and gating logic 408. The select port 402 is configured to provide a selection signal to the multiplexer $206_0$ for selecting a respective one of the processing elements 202 for memory access. The status port 404 is configured to provide various status data to, or received various status data from, each of the processing elements 202. The choose/skip port 406 is configured to receive a control signal from each of the processing elements 202 configured to either choose or skip memory access. The done port 407 is configured to receive a done signal from each of the processing elements 202 indicating that a respective processing element has completed with its memory access. The gating logic 408 is configured to drive the multiplexer $206_0$ to select the currently scheduled processing element if such processing element has asserted its choose/skip signal. If the scheduled processing element has not asserted its choose/skip signal, the gating logic 408 drives the multiplexer $206_0$ to select none of the processing elements 202 for memory access.

View 400 depicts an exemplary embodiment of the gating logic 408. In the present embodiment, the gating logic 408 comprises a multiplexer 410, a 1-bit comparator/word generator 412, a modulo counter 414, and a bitwise AND gate 416. Input ports of the multiplexer 410 are coupled to the choose/skip port 406 and are configured to receive choose/skip signals from each of the processing elements 202. That is, the multiplexer 410 includes N input ports, each of the N input ports configured to receive a choose/skip signal from a respective one of the processing elements $202_0$ through $202_{N-1}$. An output port of the multiplexer 410 is coupled to an input port of the 1-bit comparator/word generator 412.

An output port of the 1-bit comparator/word generator 412 is coupled to an input port of the bitwise AND gate 416. Output ports of the modulo counter 414 are respectively coupled to a selection port of the multiplexer 410 and another input port of the bitwise AND gate 416. Input ports of the modulo counter 414 are coupled to the done port 407 and are configured to receive done signals from each of the processing elements 202. That is, the modulo counter 414 includes N input ports, each of the N input ports configured to receive a done signal from a respective one of the processing elements $202_0$ through $202_{N-1}$. An output port of the bitwise AND gate 416 is coupled to the select port 402.

In operation, the modulo counter 414 maintains a binary count that is used to drive the multiplexer $206_0$ to select a processing element for memory access. The modulo counter 414 cycles from causing the first of the processing elements 202 (i.e., the ingress manager) to be selected, to causing the last of the processing elements 202 (i.e., the egress manager) to be selected and then back to the first of the processing elements 202. The output of the modulo counter 414 is gated by the bitwise AND gate 416.

Notably, if the currently scheduled processing element asserts its choose/skip signal, then the 1-bit comparator/word generator 412 will detect an asserted output from the multiplexer 410 (as selected by the output of the modulo counter 414) and will generate a word comprising N ones. The word produced by the 1-bit comparator/word generator 412 and the word produced by the modulo counter 414 are processed using a bitwise AND operation in the bitwise AND gate 416. Since the word generated by the 1-bit comparator/word generator 412 contains all ones, the count from the modulo counter 414 will pass through the bitwise AND gate 416 to drive the select terminal of the multiplexer $206_0$.

Conversely, if the currently scheduled processing element de-asserts its choose/skip signal, then the 1-bit comparator/word generator 412 will detect a de-asserted output from the multiplexer 410 (as selected by the output of the modulo counter 414) and will generate a word comprising N zeros. Since the word generated by the 1-bit comparator/word generator 412 contains all zeros, the count from the modulo counter 414 will not pass through the bitwise AND gate 416 to drive the select terminal of the multiplexer $206_0$. In this manner, the control circuit $208_0$ is configured to provide memory access for the processing elements 202 in accordance with a gated modulo-N schedule.

Returning to FIG. 2, in one embodiment of the invention, based on the knowledge of individual latencies of each of the processing elements 202, the memories 204 may be put into sleep mode (thus consuming less power) for a certain number of clock cycles and awakened a few clock cycles before access by the next processing element. For example, a status signal may be provided from each of the processing elements 202 to each of the control circuits $208_0$ through $208_{M-1}$. Based on the status of a given processing element, a control circuit may cause its respective memory to enter a sleep mode for a period of time and then "wake-up" the memory before access is granted to the next processing element.

Figure 5:
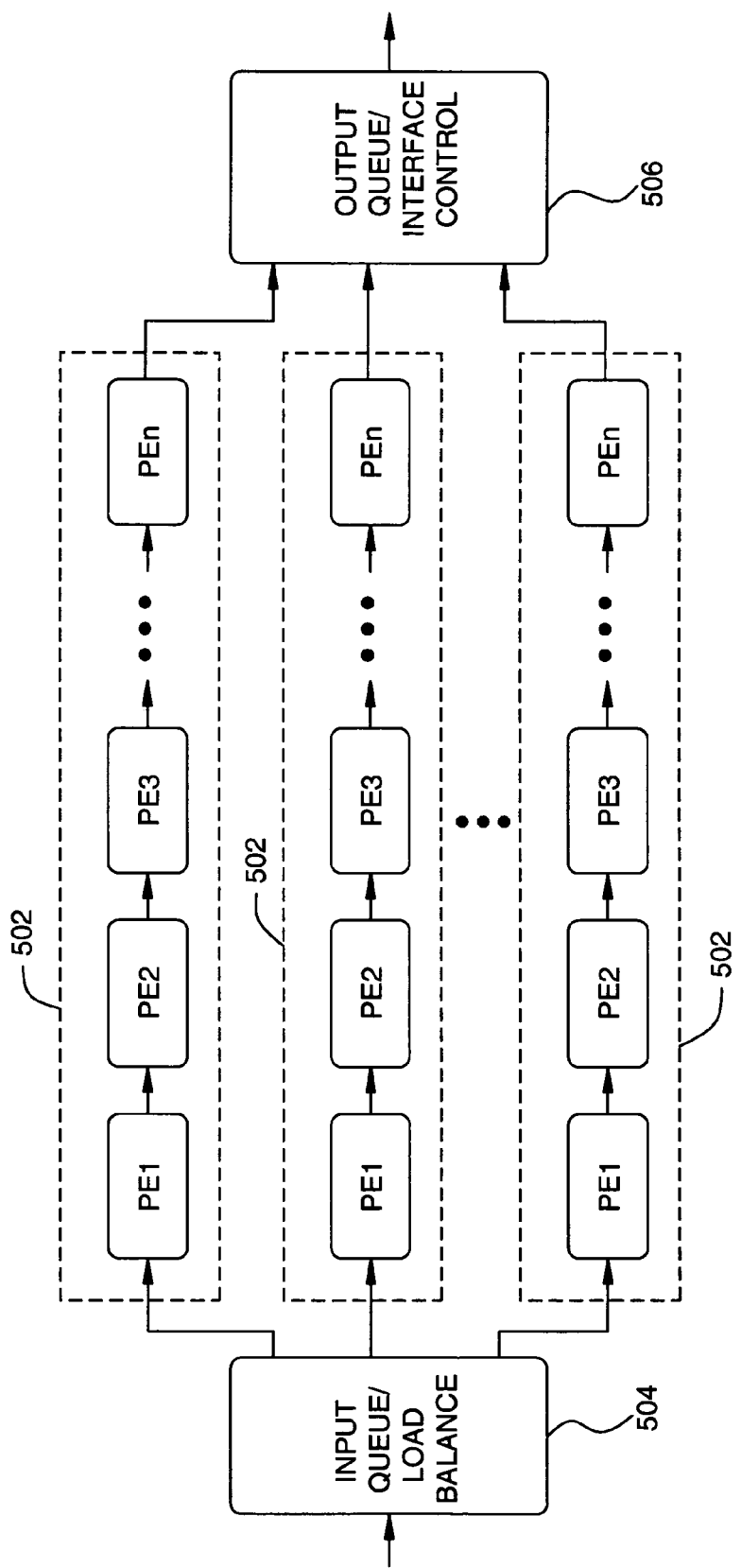
FIG. 5 is a block diagram depicting another exemplary embodiment of a message processing system constructed in accordance with the invention.

FIG. 5 is a block diagram depicting another exemplary embodiment of a message processing system 500 in accordance with the invention. The system 500 comprises a plurality of pipelines 502, and input queue/load balance circuit 504, and an output queue/interface control circuit 506. An input port of the input queue/load balance circuit 504 is configured to receive messages. Output ports of the input queue/load balance circuit 504 are respectively coupled to input ports of the pipelines 502. Output ports of the pipelines 502 are respectively coupled to input ports of the output queue/interface control circuit 506. An output port of the output queue/interface control circuit 506 is configured to provide processed messages. Each of the pipelines 502 may comprise the message processing system 200 shown in FIG. 2. For purposes of clarity, only the processing elements are shown in each of the pipelines 502 and range from $PE_1$ through $PE_N$ for each pipeline.

The input queue/load balance circuit 504 reads messages (e.g., packets from a network interface) and allocates the messages among the pipelines 502 for processing. The input queue/load balance circuit 504 balances the load across all of the pipelines 502 to ensure a more uniform latency across the pipelines 502. The output queue/interface control circuit 506 retrieves messages from the individual pipelines 502 and writes the messages to an external interface. In another embodiment, the input queue/load balance circuit 504 may be omitted and messages may be directly coupled to the pipelines 502 from an external interface (e.g., network interface).

Figure 6:
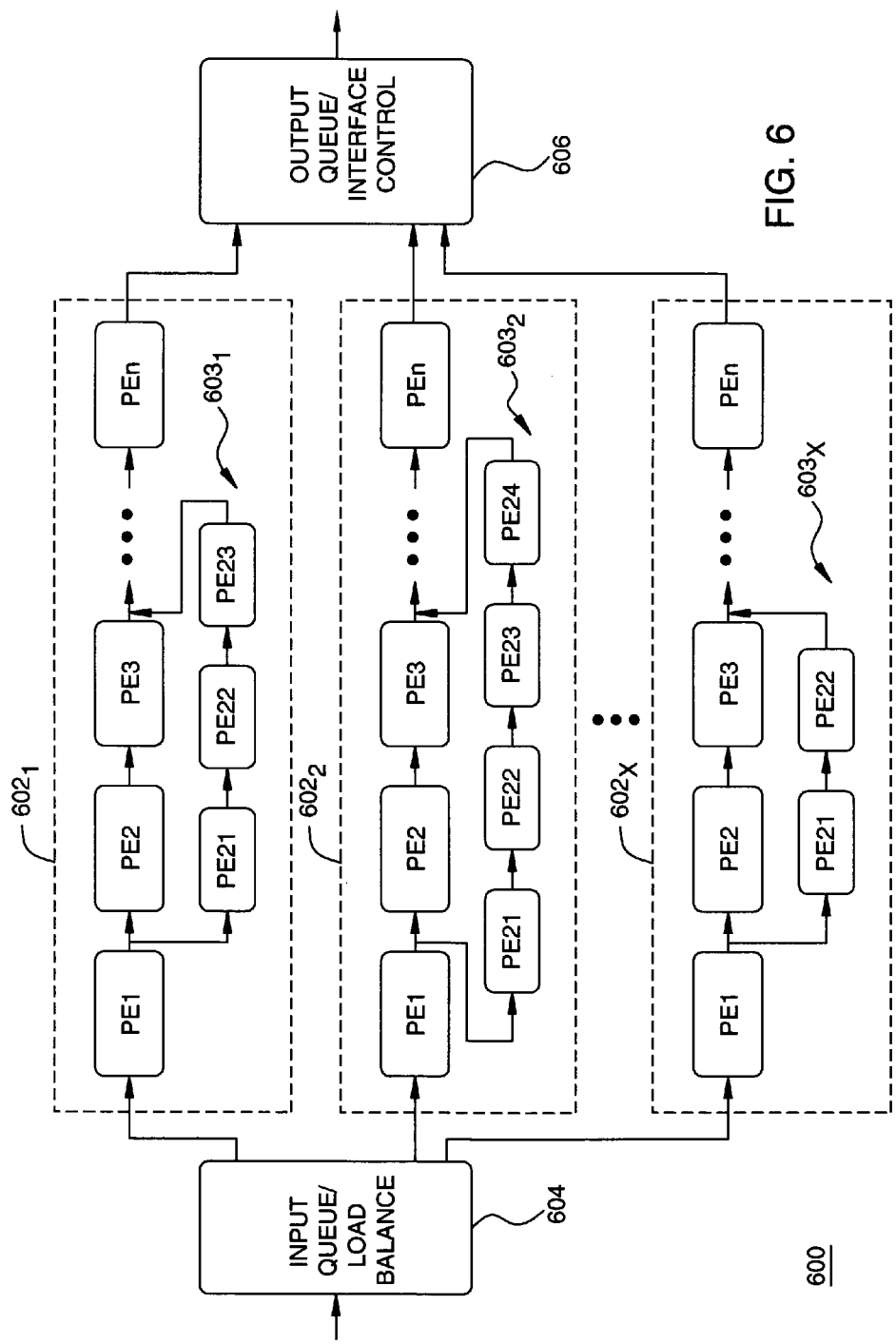
FIG. 6 is a block diagram depicting yet another exemplary embodiment of a message processing system in accordance with the invention.

FIG. 6 is a block diagram depicting yet another exemplary embodiment of a message processing system 600 in accordance with the invention. The system 600 comprises a plurality of pipelines $602_1$ through $602_X$ (collectively referred to as pipelines 602), input queue/load balance circuit 604, and an output queue/interface control circuit 606. The pipelines $602_1$ through $602_X$ respectively include sub-pipelines $603_1$ through $603_X$. Each of the sub-pipelines 603 generally includes k processing elements, where k is an integer greater than zero. In the present embodiment, the sub-pipeline $603_1$ includes three processing elements, the sub-pipeline $603_2$ includes four processing elements, and the sub-pipeline $603_X$ includes two processing elements.

Each of the pipelines 602 may comprise the message processing system 200 shown in FIG. 2, modified as described below. For purposes of clarity, only the processing elements are shown for each of the pipelines 602. The input queue/load balance circuit 604 and the output queue/interface control circuit 606 are coupled to the pipelines 602 and operate in a similar manner as described above with respect to FIG. 5.

The system 600 implements a pipeline-of-pool configuration. Notably, for the pipeline $602_1$ (the present examples may be applied to the other pipelines 602), a decision is made after the processing element $PE_1$ as to whether flow continues to processing element $PE_2$ ("primary flow") or to processing element $PE_{21}$ of the sub-pipeline $603_1$ ("sub-flow"). In one embodiment, each of the memories 204 comprises a dual-port memory (e.g., a BRAM in an FPGA). The multiplexing logic 206 includes a first set of multiplexers coupled to the memories $204_0$ through $204_{M-1}$ using the first ports thereof, and another set of M multiplexers that are coupled to the memories $204_0$ through $204_{M-1}$ using the second ports thereof. The first set of multiplexers control access to the memories 204 among the processing elements of the primary flow (e.g., $PE_1$, $PE_2$, $PE_3$, and $PE_M$). The second set of multiplexers control access to the memories 204 among the processing elements of the sub-flow (e.g., $PE_{21}$, $PE_{22}$, and $PE_{23}$). The control logic 208 provides a gated modulo-n schedule for memory access among the processing elements of the primary flow, and a gated modulo-k schedule for memory access among the processing elements of the sub-flow.

In another embodiment, the memories 204 only include one port. In such an embodiment, a second set of multiplexers is not required and the control logic is configured to provide a gated modulo-(n+k) schedule for memory access among the processing elements of the entire pipeline $602_1$. However, this will result in a longer delay through the pipeline $602_1$ equal to the delay of all of the processing elements.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. A memory apparatus for a message processing system having a set of n processing elements for processing messages, where n is an integer greater than zero, the apparatus comprising:
    a set of m memories for storing said messages, where m is an integer greater than zero;
    multiplexing logic for coupling each of said processing elements to each of said memories;
    control logic for driving said multiplexing logic to provide access to each of said memories among said processing elements in accordance with a gated modulo-n schedule;
    wherein said multiplexing logic comprises a set of m multiplexers, each of said multiplexers having an output terminal coupled to a respective memory of said set of memories, n input terminals respectively coupled to a processing element of said set of processing elements, and a select terminal; and
    wherein said control logic comprises a set of m control circuits, each of said control circuits having a select terminal coupled to a select terminal of a respective one of said multiplexers, a control interface coupled to each of said processing elements, and gating logic configured to gate said select terminal in response to control signals at said control interface.

2. The apparatus of claim 1, wherein said gating logic comprises:
    a multiplexer having input ports coupled to said control interface, an output port, and a select port;
    a 1-bit comparator/word generator having an input port coupled to said output port of said multiplexer and an output port;
    a logic gate having a first input port coupled to said output port of said 1-bit comparator/word generator, a second input port, and an output port coupled to said select terminal; and
    a modulo counter having a first output port coupled to said select port of said multiplexer, a second output port coupled to said second input port of said logic gate, and an input port coupled to said control interface.

3. The apparatus of claim 1, wherein each of said memories comprises a memory circuit embedded within a programmable logic device.

4. The apparatus of claim 3, wherein said programmable logic device comprises a field programmable gate array (FPGA), and wherein each of said memory circuits comprises a block random access memory (BRAM).

5. The apparatus of claim 3, wherein said multiplexing logic and said control logic are configured using programmable logic blocks of said programmable logic device, and wherein said multiplexing logic and said control logic are coupled to said processing elements using programmable interconnect of said programmable logic device.

6. A method for processing messages in a message processing system having a set of n processing elements, where n is an integer greater than zero, the method comprising:
    providing a set of m memories for storing messages, where m is an integer greater than zero;
    independently granting access to each of said memories among said processing elements in accordance with a gated modulo-n schedule;
    wherein said granting access is accomplished by multiplexing logic comprising:
    a set of m multiplexers, each of said multiplexers having an output terminal coupled to a respective memory of said set of memories, n input terminals respectively coupled to a processing element of said set of processing elements, and a select terminal; and
    control logic for driving said multiplexing logic to provide access to each of said memories among said processing elements in accordance with said sated modulo-n schedule, said control logic comprising:
    a set of m control circuits, each of said control circuits having a select terminal coupled to a select terminal of a respective one of said multiplexers, a control interface coupled to each of said processing elements, and gating logic configured to gate said select terminal in response to control signals at said control interface.

7. The method of claim 6, wherein each of said memories comprises a memory circuit embedded within a programmable logic device.

8. The method of claim 7, wherein said programmable logic device comprises a field programmable gate array (FPGA), and wherein each of said memory circuits comprises a block random access memory (BRAM).

9. A message processing system, comprising:
    a set of m memories for storing messages, where m is an integer greater than zero;
    a set of n processing elements for processing messages, where n is an integer greater than zero
    multiplexing logic for coupling each of said processing elements to each of said memories; and
    control logic for driving said multiplexing logic to provide access to each of said memories among said processing elements in accordance with a gated modulo-n schedule;
    wherein said multiplexing logic comprises a set of m multiplexers, each of said multiplexers having an output terminal coupled to a respective memory of said set of memories, n input terminals respectively coupled to a processing element of said set of processing elements, and a select terminal; and
    wherein said control logic comprises a set of m control circuits, each of said control circuits having a select terminal coupled to a select terminal of a respective one of said multiplexers, a control interface coupled to each of said processing elements, and gating logic configured to gate said select terminal in response to control signals at said control interface.

10. The system of claim 9, wherein each of said memories comprises a memory circuit embedded within a programmable logic device.

11. The system of claim 10, wherein said multiplexing logic and said control logic are configured using programmable logic blocks of said programmable logic device, and wherein said multiplexing logic and said control logic are coupled to said processing elements using programmable interconnect of said programmable logic device.

12. The system of claim 9, wherein one of said processing elements comprises an ingress manager, and another of said processing elements comprises an egress manager.

13. A message processing system, comprising:
    a plurality of pipelines for processing messages, each of said plurality of pipelines comprising:
    a set of m memories for storing messages, where m is an integer greater than zero;
    a set of n processing elements for processing said messages, where n is an integer greater than zero;

multiplexing logic for coupling each of said processing elements to each of said memories;

control logic for driving said multiplexing logic to provide access to each of said memories among said processing elements in accordance with a gated modulo-n schedule;

an output queue/interface control circuit for retrieving said messages from said plurality of pipelines;

wherein said multiplexing logic comprises a set of m multiplexers, each of said multiplexers having an output terminal coupled to a respective memory of said set of memories, n input terminals respectively coupled to a processing element of said set of processing elements, and a select terminal; and wherein said control logic comprises a set of m control circuits, each of said control circuits having a select terminal coupled to a select terminal of a respective one of said multiplexers, a control interface coupled to each of said processing elements, and gating logic configured to gate said select terminal in response to control signals at said control interface.

14. The system of claim 13, further comprising:

an input queue/load balance circuit for providing said messages to said plurality of pipelines.

15. The system of claim 13, wherein each of said memories comprises a memory circuit embedded within a programmable logic device.

16. The system of claim 13, wherein one or more of said plurality of pipelines further includes:

a sub-pipeline comprising k additional processing elements, where k is greater than zero;

wherein said control logic is further configured to drive said multiplexing logic to provide access to each of said memories among said additional processing elements in accordance with a gated modulo-k schedule.

* * * * *